US012401596B2

(12) United States Patent
Sallinen et al.

(10) Patent No.: US 12,401,596 B2
(45) Date of Patent: Aug. 26, 2025

(54) DELIVERY OF TRANSPORT LAYER PACKETS

(71) Applicant: OY GAMECLUSTER LTD, Espoo (FI)

(72) Inventors: Sami Sallinen, Espoo (FI); Erik Cota-Robles, Helsinki (FI)

(73) Assignee: OY GAMECLUSTER LTD, Espoo (FI)

( * ) Notice: Subject to any disclaimer, the term of this patent is extended or adjusted under 35 U.S.C. 154(b) by 0 days.

(21) Appl. No.: 17/927,070

(22) PCT Filed: May 24, 2022

(86) PCT No.: PCT/FI2022/050359
§ 371 (c)(1),
(2) Date: Nov. 22, 2022

(87) PCT Pub. No.: WO2022/248769
PCT Pub. Date: Dec. 1, 2022

(65) Prior Publication Data
US 2025/0080465 A1    Mar. 6, 2025

(30) Foreign Application Priority Data
May 26, 2021 (EP) .................................. 21175919

(51) Int. Cl.
*H04L 47/193* (2022.01)
*H04L 47/10* (2022.01)
(Continued)

(52) U.S. Cl.
CPC ............ *H04L 47/193* (2013.01); *H04L 47/18* (2013.01); *H04L 47/267* (2022.05); *H04L 47/34* (2013.01)

(58) Field of Classification Search
CPC ..... H04L 47/193; H04L 47/18; H04L 47/267; H04L 47/34; H04L 69/163; H04L 69/326
See application file for complete search history.

(56) References Cited

U.S. PATENT DOCUMENTS 7,502,860 B1 * 3/2009 Champagne .......... H04L 69/326
709/227
9,185,045 B1 * 11/2015 Yang ................. H04W 28/0289
(Continued)

FOREIGN PATENT DOCUMENTS

| JP | 2008-109698 A | 5/2008 |
| JP | 2012-182551 A | 9/2012 |
| JP | 2018-148555 A | 9/2018 |

OTHER PUBLICATIONS

Office Action issued in Japanese Patent Application No. 2022-581436 dated Jul. 11, 2023.
(Continued)

*Primary Examiner* — Wutchung Chu
(74) *Attorney, Agent, or Firm* — NIXON & VANDERHYE

(57) ABSTRACT

Disclosed is an apparatus for communication over a packet-switched network, including a transport protocol portion causing the apparatus to: transmit user data in a sequence of data blocks having respective sequence numbers; receive acknowledgements blocks acknowledging reception of at least some of the data blocks; retransmit those ones of the data blocks that are not acknowledged by the other apparatus, enter a congestion avoidance state in response to a predefined amount of the data blocks not being acknowledged by the other apparatus. The apparatus includes a complementary transport protocol portion to: provide the transport protocol portion with information indicating acknowledgement of all data blocks up to one having a first reference sequence number assigned thereto, and selectively
(Continued)

cause the apparatus to transmit a control block instructing the other apparatus to ignore any unreceived data blocks having a sequence number that is smaller than a second reference sequence number.

20 Claims, 5 Drawing Sheets

(51) Int. Cl.
  *H04L 47/267* (2022.01)
  *H04L 47/34* (2022.01)

(56) References Cited

U.S. PATENT DOCUMENTS

| | | | |
|---|---|---|---|
| 11,973,604 B2* | 4/2024 | Tao | H04L 1/188 |
| 2003/0154301 A1* | 8/2003 | McEachern | H04L 45/16 |
| | | | 709/237 |
| 2007/0178916 A1* | 8/2007 | Sorbara | H04L 1/1838 |
| | | | 455/458 |
| 2010/0039926 A1* | 2/2010 | Zhang | H04J 13/0048 |
| | | | 370/208 |
| 2010/0260180 A1* | 10/2010 | Wu | H04L 1/1819 |
| | | | 370/390 |
| 2010/0284338 A1* | 11/2010 | Persson | H04L 49/90 |
| | | | 370/328 |
| 2020/0322277 A1* | 10/2020 | Li | H04L 47/365 |
| 2021/0258109 A1* | 8/2021 | Cho | H04L 1/1642 |

OTHER PUBLICATIONS

International Search Report for PCT/FI2022/050359, dated Jul. 12, 2022, 3 pages.
Written Opinion of the ISA for PCT/FI2022/050359, dated Jul. 12, 2022, 4 pages.
European Search Report dated Nov. 17, 2021, for EP 21 17 5919, 1 page.
Stewart et al., "Stream Control Transmission Protocol (SCTP) Partial Reliability Extension", Internet Citation, XP002399823, May 1, 2004, pp. 1-22.
Rajiullah et al., "Performance analysis and improvement of PR-SCTP for small messages", Elsevier, Computer Networks, vol. 57, No. 18, XP028775022, Oct. 6, 2013, pp. 3967-3986.

* cited by examiner

DELIVERY OF TRANSPORT LAYER PACKETS

This application is the U.S. national phase of International Application No. PCT/FI2022/050359 filed May 24, 2022 which designated the U.S. and claims priority to EP 21175919.6 filed May 26, 2021, the entire contents of each of which are hereby incorporated by reference.

TECHNICAL FIELD

The present invention relates to delivery of transport layer packets over a packet-switched communication network.

BACKGROUND

Data transport over packet-switched networks such as the Internet typically relies on the Transmission Control Protocol (TCP) on top of the Internet Protocol (IP). While TCP/IP constitutes a proven and widely applied protocol suite for transport of data, delays arising from strict in-sequence delivery of data packets, retransmissions occurring due to packets lost in the network and internal buffering of packets by a transmitting TCP host due to flow control and congestion control mechanisms makes TCP unsuitable for networked interactive real-time applications that require timely delivery of packets and messages over a packet-switched network. Well-known examples of such applications include audio and/or video telephony, audio and/or video conferencing, peer-to-peer gaming, cloud-based gaming, etc. In such an application the additional delay that would arise from retransmission of packets delayed or lost in the network or from extensive buffering of packets by the transmitting end due to flow control and/or congestion control mechanisms typically leads to a poor user experience and may even render such an application virtually unusable. In particular, the TCP flow control mechanism that may abruptly reduce the bandwidth applied for packet transmission in response to packet losses may have a severe detrimental effect on perceived user experience of a networked interactive real-time application that requires real-time delivery of relatively high-bandwidth data such as a video stream.

The User Datagram Protocol (UDP) provides an alternative way of transmitting data packets over the packet-switched network on top of IP. Unlike TCP, UDP leaves control over aspects such as packet buffering, reliable delivery of packets and any flow control and/or congestion control actions to be taken for higher layer protocols and/or for an application relying on UDP/IP. While such an approach facilitates avoiding any unnecessary delays in transporting packets over the packet-switched network, it also allows for an application to monitor round-trip times over the network and any packet losses possibly occurring in the network and to use this information to implement flow control and congestion control mechanisms that account for specific requirements of the application. Using a video stream as an example in this regard, an application may implement congestion control by reducing video resolution and/or video frame rate applied in the video stream. Furthermore, UDP allows for an application to use mechanisms such as Forward Error Correction (FEC) to combat packet losses possibly occurring in the network in a pre-emptive manner without incurring an extensive additional delay. Such characteristics render UDP well suited for networked interactive real-time applications.

An example of a protocol that at least partially addresses shortcomings of TCP in terms of requirements of networked interactive real-time application is the Stream Control Transport Protocol (SCTP). SCTP provides a reliable transport for both ordered and out-of-order packet data streams, while on the other hand it employs a TCP-like congestion control mechanism. Hence, despite some advantageous features of SCTP in comparison to TCP in view of networked interactive real-time applications, some performance-limiting issues still remain: SCTP employs a retransmission scheme to ensure reliable data transport, while for a networked interactive real-time application the additional round-trip time arising from retransmissions of packets lost in the network in many cases results in a more severe degradation in user-experienced service quality that that resulting from loss of a relatively small amount of data packets. Moreover, the reduction of transmission bandwidth in response to packet losses in the network via operation of the SCTP congestion control mechanism almost always result in a drop of user-experienced service quality that is more severe than in a scenario where the networked interactive real-time application is allowed to scale down the rate of transmitting data in a content-aware manner by, for example, reducing the video resolution and/or the video frame rate applied for the video stream.

However, in many operating systems and/or application platforms such as web browsers network connectivity may be provided via an application programmable interface (API) or a socket interface, which predominantly offer TCP based connections that are not suitable for the networked interactive real-time applications. On the other hand, e.g. due to security concerns involved, such APIs or socket interfaces typically do not offer UDP based connections or they may be only provided with additional higher-level protocol support that may render the connection ill-suited for a networked interactive real-time application. Nevertheless, for example web browsers provide an interesting platform for applications of many type, including networked interactive real-time applications. Recent developments in protocols that are applicable by operating systems and/or application platforms, such as web browsers, have led to more real-time communication friendly network interfaces that make use of SCTP instead of TCP. An example in this regard is the Web Real-Time Communication (WebRTC) protocol that specifies protocol support for direct, interactive, rich communication using audio, video, and data between two peers' web browsers, which defines usage of SCTP as a generic transport service that allows web browsers to exchange generic data from peer to peer while defining Secure Real-Time Transport Protocol (SRTP) for media transport (see e.g. RFC8331).

While frameworks such as the WebRTC pave the way for implementing networked interactive real-time applications in the framework of operating system and/or application platforms such as web browsers, for example an operating system or a browser implementing a protocol such as the WebRTC (or similar) typically provides the network connection via respective interfaces to the SCTP and SRTP stacks, thereby making the performance of a networked real-time application operating in such a framework at least partially dependent on performance of these protocol stacks. In particular, inherent delay and/or functionalities involved in communication via such built-in protocol stacks may make it impossible for the networked interactive real-time application to have a meaningful control over aspects that have a direct or indirect impact on the round-trip time and an amount of packet losses occurring in the network, thereby resulting in compromised performance in terms of user experienced service quality, which may be especially pronounced in applications such as cloud gaming and peer-to-peer gaming.

In related art, RFC 3758, "Stream Control Transmission Protocol (SCTP) Partial Reliability Extension" by Randal Stewart et al. discloses an extension to the SCTP that allows an SCTP endpoint to signal to its peer that it should move the cumulative ack point forward. When both sides of an SCTP association support this extension, it can be used by an SCTP implementation to provide partially reliable data transmission service to an upper layer protocol.

SUMMARY

It is an object of the present invention to provide an approach that allows for an application to communicate over a packet switched network via a predefined interface to a predefined transport protocol in a manner that allows for improved control over round-trip time of the communication.

According to an example embodiment, an apparatus for communication with another apparatus over a packet-switched network is provided, the apparatus comprising a transport protocol portion arranged to cause the apparatus to carry out at least the following: transmit, to the other apparatus, user data in a sequence of data blocks having respective sequence numbers assigned thereto, receive, from the other apparatus, acknowledgements blocks acknowledging reception of at least some of said data blocks, retransmit, to the other apparatus, those ones of said data blocks that are not acknowledged by the other apparatus, enter a congestion avoidance state in response to a predefined amount of said data blocks not being acknowledged by the other apparatus, wherein the apparatus comprises a complementary transport protocol portion arranged to: provide the transport protocol portion with information that indicates acknowledgement of all data blocks up to one having a first reference sequence number assigned thereto, and selectively cause the apparatus to transmit, to the other apparatus, a control block instructing the other apparatus to ignore any unreceived data blocks having assigned thereto a sequence number that is smaller than a second reference sequence number.

According to another example embodiment, a method in an apparatus for communication with another apparatus over a packet-switched network in accordance with a transport protocol is provided, the communication according to the transport protocol comprising: transmitting, to the other apparatus, user data in a sequence of data blocks having respective sequence numbers assigned thereto, receiving, from the other apparatus, acknowledgements blocks acknowledging reception of at least some of said data blocks, retransmitting, to the other apparatus, those ones of said data blocks that are not acknowledged by the other apparatus, entering a congestion avoidance state in response to a predefined amount of said data blocks not being acknowledged by the other apparatus, wherein the method further comprises providing the transport protocol with information that indicates acknowledgement of all data blocks up to one having a first reference sequence number assigned thereto, and selectively transmitting, to the other apparatus, a control block instructing the other apparatus to ignore any unreceived data blocks having assigned thereto a sequence number that is smaller than a second reference sequence number.

According to another example embodiment, a computer program is provided, the computer program comprising computer readable program code configured to cause performing at least a method according to an example embodiment described in the foregoing when said program code is executed on a computing apparatus.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatuses at least to perform the method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described in the following examples may be used in combinations other than those explicitly described, unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1:
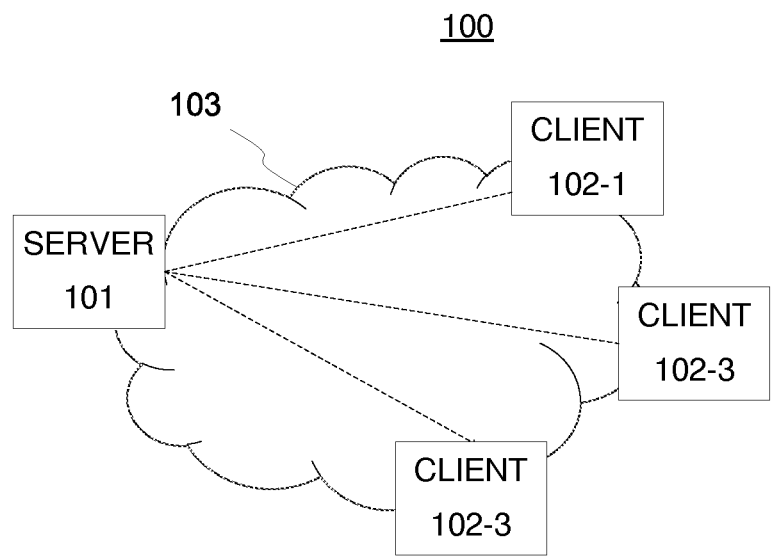
FIG. 1 illustrates a block diagram of some elements of a communication system according to an example.

FIG. 1 illustrates a block diagram of some elements of a communication system 100 according to an example, including a server apparatus 101 and client apparatuses 102-1, 102-2 and 102-3. The client apparatuses 102-1, 102-2 and 102-3 represent one or more client apparatuses, where any single client apparatus may be referred to via a reference number 102-$k$ and the one or more client apparatuses may be jointly referred to via a reference number 102. The server apparatus 101 and each of the client apparatuses 102-$k$ may be also referred to as respective endpoints, hosts or nodes. Each of the client apparatuses 102-$k$ is communicatively coupled to the server apparatus 101 via a communication network 103, which may comprise a packet-switched network such as the Internet. In the following, some aspects of communication via usage of the communication system 100 are described with references to the server apparatus 101 and the client apparatus 102-k.

Each of the sever apparatus 101 and the client apparatus 102-k may comprise a respective computer apparatus, which may comprise a processor and a memory, where the memory is arranged to store computer program code that, when executed by the processor, causes the apparatus to operate as the respective one of the server apparatus 101 or the client apparatus 102-k according to the present disclosure. A more detailed example of using such a computer apparatus for providing the server apparatus 101 or the client apparatus 102-k is provided in the following with reference to FIG. 7.

Each of the server apparatus 101 and the client apparatus 102-k may execute respective applications, which may be referred to as a server application and a client application, respectively. According to an example, each of the server application in the server apparatus 101 and the client application in the client apparatus 102-k may be arranged for communication with each other via the communication network 103 according to a communication model illustrated in FIG. 2: each of the server application and the client application operate on an application layer, whereas access to packet-switched communication over the communication network 103 is provided by an Internet Protocol (IP) layer (or another network layer protocol). In this regard, the server application and the client application (or any other application of the application layer) may have access to the IP layer via a transport layer, which may be implemented via operation of a transport protocol. An example of a transport protocol applicable in context of the present disclosure is the Session Control Transport Protocol (SCTP), some aspects of which will be described in further detail later in this text.

Figure 2:
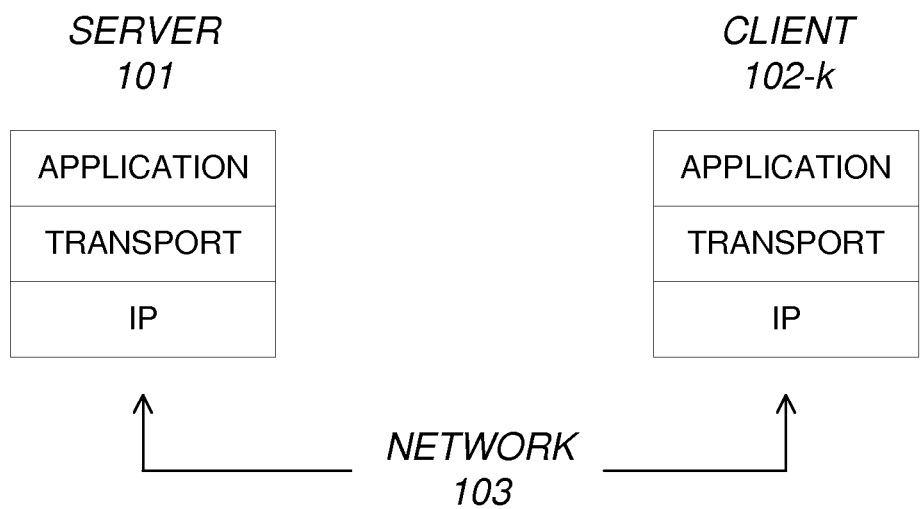
FIG. 2 illustrates a communication model according to an example.

In this regard, it should be noted that the communication model shown in FIG. 2 is a simplified one that intentionally omits protocol layers below the IP layer (or another network layer protocol) and predominantly aims at illustrating the relationship between the application and the transport protocol described in the present disclosure. In other examples the application may interface the transport protocol in the transport layer via one or more intermediate protocol layers and/or the transport protocol in the transport layer may interface the IP layer (or another network layer protocol) via one or more intermediate protocol layers.

The transport protocol applied in communication between the server application in the server apparatus 101 and the client application in the client apparatus 102-k may define one or more data formats and one or more procedures that specify transfer of data between these two entities. Typically, the transport protocol is specified by a communication standard to enable and ensure interoperability between two entities originating from different vendors. According to an example, the server application and the client application may have access to the transport protocol in the transport layer (only) via an application programmable interface (API) or a socket interface provided by an operating system or by an application platform executing in the respective one of the server apparatus 101 and the client apparatus 102-k.

As an example in this regard, the client apparatus 102-k may comprise a general-purpose user device such as a mobile phone, a tablet computer, a laptop computer, a desktop computer, etc. that implements a browser application tailored to operate in the framework of the operating system executed by the user device. In such a scenario, the client application may operate in the browser application and, consequently, the client application may (only) have access to the transport protocol of the transport layer via the API or socket interface available via the browser application. On the other hand, the server apparatus 101 is in many cases provided via an apparatus that is dedicated or at least tailored to match the requirements of the server application it serves to execute and, therefore, the server application may also have some additional flexibility (in comparison to the client application) in accessing and using the transport protocol and/or other services provided by the transport layer in the server apparatus 101. Nevertheless, regardless of such flexibility, the transport protocol in the server apparatus 101 is necessarily bound by the underlying standard in terms of data formats applied in communication with the client apparatus 102-k.

For purposes of the present disclosure, a respective entity serving to provide the transport protocol in each of the server apparatus 101 and the client apparatus 102-k may be referred to as a respective transport protocol portion. In this regard, the respective transport protocol portions in the server apparatus 101 and the client apparatus 102-k may provide reliable transport of user data from the server application in the server apparatus 101 to the client application in the client apparatus 102-k and vice versa. In this regard, the transmission of user data may be described with references to a transmitting endpoint (e.g. from one of the server apparatus 101 and the client apparatus 102-k) and a receiving endpoint (e.g. to the other one of the server apparatus 101 and the client apparatus 102-k). In this regard, the transport protocol portion in the transmitting endpoint may carry out at least the following when transporting the user data to (the transport portion in) the receiving endpoint:

transmit the user data in a sequence of data blocks, where each data block has a respective sequence number assigned thereto that indicates its position in the sequence of data blocks;

receive, from (the transport protocol portion of) the receiving endpoint, acknowledgement blocks that each acknowledge reception of one or more data blocks transmitted from the transmitting endpoint;

retransmit those data blocks that are not acknowledged by (the transport protocol portion of) the receiving endpoint; and enter a congestion avoidance state in response to at least a predefined amount of the data transmitted from the transmitting endpoint not being acknowledged by (the transport protocol portion of) the receiving endpoint.

Referring back to the transmitting endpoint transmitting the user data, the transport protocol portion in the transmitting endpoint may arrange the user data originating from the server application into a sequence of data blocks in accordance with a predefined maximum data block size, where each data block of the sequence is assigned a monotonically increasing sequence number prior to being transmitted in order to the receiving endpoint. Each data block may include the respective piece of user data together with a block header, where the block header may include the sequence number assigned to the respective data block, possibly together with further control information pertaining to the user data carried in the respective data block and/or to data transport between the transmitting endpoint and the receiving endpoints in general. The transmitting endpoint may arrange one or more (consecutive) data blocks in increasing order of their sequence numbers into a transport packet. In this regard, the transport packet may include a packet header carrying (further) control information pertaining to the data blocks carried in the respective transport packet and/or to data transport between the transmitting endpoint and the receiving endpoints in general together with the one or more data blocks. The number and/or combined size of the data blocks included in the transport packet may be set or selected in view of a maximum allowable packet size defined for the transport packets.

Referring back to the transmitting endpoint receiving the acknowledgement blocks from the receiving endpoint, each acknowledgement block may report reception of one or more data blocks transmitted from the transmitting endpoint at the receiving endpoint. Like the data blocks, also the acknowledgement blocks may be transmitted between the endpoints in transport packets. In this regard, the acknowledged data blocks may be identified and/or indicated in the acknowledgement block via the sequence numbers assigned to the data blocks. Consequently, an acknowledgement block may include respective indications of the sequence numbers assigned to one or more data blocks received at the receiving endpoint. Herein, an indication pertaining to the sequence number of a given data block may comprise the sequence number assigned to the given data block as such and/or one or more pieces of information that enable deriving the sequence number assigned to the given data block. In an example, the sequence-number-indicating information included in an acknowledgement block may include the following:

- a received sequence indicator that indicates the sequence number assigned to the last data block of a continuous sub-sequence of data blocks received at the receiving endpoint;
- optionally, respective indications of one or more further sequence numbers that are assigned to respective one or more data blocks that follow said continuous sub-sequence of data blocks with at least one gap in the sequence.

Hence, the respective indications of the one or more further sequence numbers, if included in the acknowledgement block, may identify data blocks that have respective sequence numbers larger than that indicated by the received sequence indicator, thereby informing the transmitting endpoint of at least one gap in the received sequence of data blocks in the receiving endpoint.

Referring back to the transmitting endpoint retransmitting those ones of the data blocks already transmitted therefrom that are not acknowledged by the receiving endpoint, as an example, the transport protocol portion in the transmitting endpoint may proceed with retransmission of a non-acknowledged data block in response to the acknowledgement blocks received from the receiving endpoint indicate at least one gap in the received sequence of data blocks and/or in response to a retransmission window pertaining to the respective data block expiring. Herein, the retransmission window may cover an estimated round-trip time between the transmitting and receiving endpoints extended with a predefined or adaptive safety margin, thereby resulting in retransmission of a given data block in response to the acknowledgement pertaining to the respective data block being delayed by more than the safety margin.

Referring back to the transmitting endpoint entering the congestion avoidance state, the transport protocol portion in the transmitting endpoint may temporarily reduce the data rate applied in transmitting the data blocks therefrom in accordance with one or more predefined rules in response to at least the predefined amount of the data transmitted therefrom not being acknowledged by the receiving endpoint, where the predefined amount may pertain to the number of yet-unacknowledged data blocks transmitted from the transmitting endpoint or to an amount of yet-unacknowledged data (e.g. in bytes) transmitted from the transmitting endpoint. In this regard, non-acknowledgement of a data block may occur due to the respective data block or an acknowledgement block pertaining thereto being lost due to congestion in the transport path, or due to the respective data block and/or the acknowledgement block being delayed by more than a predefined amount due to congestion in the transport path. In an example, the entry to the congestion avoidance may be triggered by non-acknowledgment of a single data block, whereas in another example the entry to the congestion avoidance may be triggered by non-acknowledgement of a predefined number and/or a predefined percentage of data blocks transmitted from the transmitting endpoint within a predefined time window or by non-acknowledgment of a predefined amount of data transmitted from the transmitting endpoint.

According to various examples, the server apparatus 101 and/or the client apparatus **102-*k* may further comprise a complementary transport protocol portion arranged to provide further transport layer services in order to enhance operation of the respective one of the server application in the server apparatus 101 and/or the client application in the client apparatus 102-*k*. In this regard, the complementary transport protocol portion may, at least conceptually, provide a sub-layer within the transport layer between the transport protocol portion and the IP layer. As the naming suggests, the complementary transport protocol portion may serve to complement operation of the transport protocol portion described in the foregoing to enhance operation of the respective one of the server application and/or the client application. In this regard, operations carried out by the complementary transport protocol portion are such that they do not interfere with interoperability between the respective transport protocol portions in the server apparatus 101 and the client apparatus 102-*k*** in terms of data formats applied in communication between the two. As a few examples in this regard, the complementary transport protocol portion may carry out operations that facilitate timely transport of real-time interactive media such as an audio stream and/or a video stream e.g. in context of a video telephony application, a video conferencing application or a gaming application.

Along the lines described in the foregoing, in many communication scenarios the client apparatus **102-*k* comprises a general-purpose user device, where the server apparatus 101-*k* may be dedicated or otherwise tailored for specific characteristics of communication between the server application in the server apparatus 101 and the client application in the client apparatus 102-*k*. Consequently, in an example, the transport layer in the server apparatus 101 may be provided with the transport protocol portion and the complementary transport protocol portion, whereas the client apparatus 102-*k* may be provided with the transport protocol portion only. In another example, the roles may be changed such that the client apparatus 102-*k* may be provided with both the transport protocol portion and the complementary transport protocol portion while the server apparatus 101 may be provided with the transport protocol portion only, whereas in a further example both the server apparatus 101 and the client apparatus 101-*k* may be provided with the transport protocol portion and the complementary transport protocol portion. In the interest of clarity and brevity of description, the following examples proceed from the assumption that the server apparatus 101 is provided with both the transport protocol portion and the complementary transport protocol portion, whereas the client apparatus 102-*k*** may be provided with the transport protocol portion only.

According to an example, the complementary transport protocol portion in the server apparatus 101 may be arranged to provide the transport portion in the server apparatus 101 with information that indicates acknowledgement of all data blocks transmitted therefrom to the client apparatus 102-k up to one having a first reference sequence number assigned thereto. As an example in this regard, the first reference sequence number may comprise the reference number assigned to the most recently transmitted data block (i.e. the one most recently transmitted from the server apparatus 101 to the client apparatus 102-k). In other examples, the first reference sequence number may comprise the sequence number assigned to another recently transmitted data block e.g. to one that immediately precedes the most recently transmitted data block or, in general, the sequence number assigned to the N:th most recently transmitted data block. Consequently, the transport protocol portion in the server apparatus 101 is provided with information that avoids data block retransmission and/or entry to the congestion avoidance state by the transport protocol portion.

The aspect of the complementary transport protocol portion providing the transport portion with information that indicates acknowledgement of all data blocks transmitted therefrom may comprise the complementary transport protocol portion modifying the acknowledgement blocks received from the client apparatus 102-k before passing them to the transport protocol portion such that they indicate reception of all data blocks transmitted from the server apparatus 101 up to the data block having the first reference sequence number assigned thereto. As an example in this regard, along the lines described in the foregoing, the acknowledgment block may include respective indications of sequence numbers assigned to one or more data blocks received at the client apparatus 102-k, whereas the complementary transport protocol portion may modify the acknowledgment block to indicate reception of all data blocks transmitted from the server apparatus 101 up to the one having the first reference sequence number assigned thereto. Further in this regard, the acknowledgement block may indicate the respective sequence numbers assigned to data blocks received thereat via the received sequence indicator described in the foregoing, whereas the complementary transport protocol portion may replace the received sequence indicator in the acknowledgement block with one that indicates the first reference sequence number. Optionally, the acknowledgement block may include respective indications of one or more further sequence numbers described in the foregoing, whereas the complementary transport protocol portion may remove the indications of the one or more further sequence numbers from the acknowledgement block.

The aspect of the complementary transport protocol portion providing the transport protocol portion with information that indicates acknowledgement of all data blocks transmitted therefrom may result in masking possible gaps in the sequence of data blocks acknowledged by the client apparatus 102-k and, consequently, it may serve to prevent the transport protocol portion in the server apparatus 101 from retransmitting any of the data blocks and/or to prevent the transport protocol portion in the server apparatus 101 from entering the congestion avoidance state. Since operation of the complementary transport protocol portion may prevent the transport protocol portion from detecting possible unacknowledged data blocks, the user data transmitted from the server apparatus 101 to the client apparatus 102-k may include information that enables detecting possibly missing pieces of user data at the client apparatus 102-k and/or the user data transmitted from the server apparatus 101 to the client apparatus 102-k may include information that enables monitoring round-trip times between the server apparatus 101 and the client apparatus 102-k. Moreover, the user data transmitted from the client apparatus 102-k to the server apparatus 101 may include information that indicates the amount of user data buffered at the client apparatus 102-k, which may provide the server application with additional information for controlling transmission of user data to the client apparatus 102-k.

As non-limiting examples in this regard, the user data originating from the server application may be provided to the transport protocol portion in the server apparatus 101 as a sequence of (application) data frames, which may be provided with respective application sequence numbers and/or with ordering information of other kind, whereas the transport protocol portion may arrange the application data frames into the sequence of data blocks for transmission to the client apparatus 102-k. Moreover, the client apparatus 102-k may respond to the application data frames it receives by transmitting, to the server apparatus 101, application layer acknowledgements that report successfully received application data frames via references to their respective application sequence numbers and/or to ordering information of other kind included in the application data frames. An example of such user data includes a media stream such as an audio stream and/or a video stream comprising a sequence of media frames that may be arranged into media packets that each include one or more media frames and that have a respective application sequence number and/or a respective timestamp. The media packets may serve as the application data frames to be transmitted in the sequence of data blocks, whereas the client apparatus 102-k may respond to the media packets received thereat by transmitting, to the server apparatus 101, application layer acknowledgements that report successfully received media packets (or the media frames) via references to their application sequence numbers and/or to their timestamps.

Still referring to characteristics and/or operation of the server application in the server apparatus 101 and/or the client application in the client apparatus 102-k, the server application may react to gaps in the sub-sequence of application data frames received at the client application and/or the increase in observed round-trip time via selectively retransmitting non-acknowledged application data frames and/or via selectively applying a FEC mechanism to transmit redundant data that enables reconstructing at least some of the application frames that may be lost in the communication network 103. Hence, e.g. in case of media packets, a media frame or a media packet lost in the communication network 103 may be retransmitted in response to a lack of acknowledgement pertaining to the respective media frame/packet or it may be reconstructed based on redundant data transmitted via operation of the FEC mechanism. Moreover, in case of media packets serve to convey an audio stream and/or a video stream, the client application may be able to tolerate loss of media frames or media packets to a certain extent, e.g. up to media frame loss rates of a few percent without a significant effect to perceivable user-experienced media quality via usage of respective error concealment mechanisms included in the applied audio and/or video decoder.

Regarding congestion avoidance and/or congestion control, any congestion control actions taken by the server apparatus 101 may be carried out via operation of the server application executing in the server apparatus 101. In this regard, the congestion control and/or congestion avoidance may be carried out, for example, in dependence of information received as part of the user data (e.g. respective application data frames) originating from the client application in the client apparatus 102-$k$ and/or in dependence of round-trip times observed in the server application. In this regard, the application data frames received from the client apparatus 102-$k$ at the server apparatus 101 may include acknowledgements of those application data frames transmitted from the server apparatus 101 to the client apparatus 102-$k$ that are successfully received at the client apparatus 102-$k$, which acknowledgements enable the server application to detect application data frames that have been lost on their way from the server apparatus 101 to the client apparatus 102-$k$ and to estimate round-trip times between the server apparatus 101 and the client apparatus 102-$k$. Consequently, the server application may adjust its operation e.g. such that the data rate of the application data frames transmitted therefrom is reduced in case application data frame loss rate observed at the server application and/or round-trip times measured in the server application suggest congestion in the communication network 103. Using again the media stream as an example, the server application may react to congestion in the communication network 103 by reducing source data rate of the media stream via reduction of media quality e.g. via reduction on media resolution (e.g. granularity of audio representation and/or image resolution) and/or via reduction of media frame rate.

According to an example, the complementary transport protocol portion in the server apparatus 101 may be arranged to selectively cause the server apparatus 101 to transmit, to the client apparatus 102-$k$, a control block that instructs the client apparatus 102-$k$ (e.g. the transport protocol portion) to ignore any data blocks transmitted from the server apparatus 101 that have assigned thereto a sequence number that is smaller than a second reference sequence number. In this regard, the control block serves to avoid (the transport protocol portion in) the client apparatus 102-$k$ reporting non-acknowledgement these data blocks in order to have the retransmitted by the transport protocol portion in the server apparatus 101, which is unaware of possible gaps in the sub-sequence of data blocks received at the client apparatus 102-$k$ due to operation of the complementary transport protocol portion in the server apparatus 101. Instead, along the lines described above, any retransmission of user data or possible congestion avoidance actions may be carried out via operation of the server application in the server apparatus 101 based on information exchanged in the application data frames.

The control block transmitted from the server apparatus 101 may include information that identifies the second reference sequence number, e.g. the second reference sequence number as such and/or one or more pieces of information that enable deriving the second reference sequence number. Along the lines described in the foregoing for the data blocks and the acknowledgement blocks, also the control blocks may be transmitted between the server apparatus 101 and the client apparatus 102-$k$ in transport packets. The selective transmission of the control block may involve transmission that occurs according to a predefined schedule and/or transmission that occurs in response to one or more predefined criteria that pertain to sequence numbers assigned to the data blocks transmitted from the server apparatus 101. As an example, the second reference sequence number may comprise the reference number assigned to the most recently transmitted data block (i.e. the one most recently transmitted from the server apparatus 101 to the client apparatus 102-$k$). In other examples, the second reference sequence number may comprise the sequence number assigned to another recently transmitted data block e.g. to one that immediately precedes the most recently transmitted data block or, in general, the sequence number assigned to the N:th most recently transmitted data block. In one example, the second reference sequence number is the same as the first reference sequence number, whereas in another example the second reference sequence number is different from the first reference sequence number.

Reception of the control block at the client apparatus 102-$k$ results in the transport protocol portion in the client apparatus 102-$k$ considering all data blocks up to the one having the second reference sequence number assigned thereto being either successfully received or redundant, thereby setting the transport protocol portion into a state where it does not report any gaps in the received sub-sequence of data blocks having a sequence number smaller than or equal to the second reference sequence number assigned thereto and hence does not expect retransmissions of such data blocks that may be lost or seriously delayed in the transport path from the server apparatus 101 to the client apparatus 102-$k$.

As an example, the selective transmission of the control block may be carried out in response to the received sequence indicator (described in the foregoing) received in one or more acknowledgement blocks from the client apparatus (102-$k$) indicating a sequence number that is smaller than the second reference sequence number. In other words, the transmission of the control block may be triggered by the client apparatus 102-$k$ indicating that the last data block of a continuous sequence of data blocks it has received has assigned thereto a sequence number that is smaller than the second reference sequence number. In this regard, the transmission of the control block may be triggered, for example, reception of an acknowledgement block from the client apparatus 102-$k$.

In another example, the selective transmission of the control block may be carried out further in consideration of time elapsed since the most recent previous transmission of such a control block. In this regard, the selective transmission of the control block may be carried out in response to the received sequence indicator received in one or more acknowledgement blocks from the client apparatus (102-$k$) indicating a sequence number that is smaller than the second reference sequence number provided that at least a predefined amount of time has passed since the most recent previous transmission of such a control block. In this regard, the predefined amount of time may be, for example, a value chosen from a range from 2 milliseconds to 100 milliseconds, e.g. 5 milliseconds. In a further example, the selective transmission of the control block may follow a predefined schedule, e.g. such that the control block may be transmitted at predefined time intervals. Also in this approach the predefined time interval may be, for example, a value chosen from a range from 2 milliseconds to 100 milliseconds, e.g. 5 milliseconds.

Figure 3:
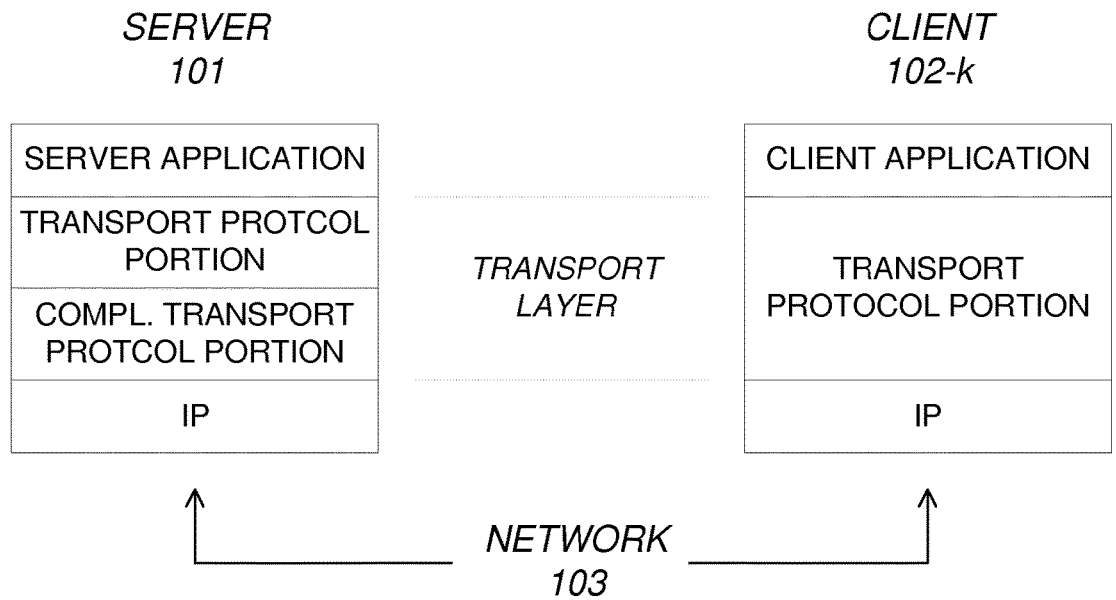
FIG. 3 illustrates a communication model according to an example.

FIG. 3 illustrates the communication model of FIG. 2 at a further detail in consideration of operation of the transport protocol portion and the complementary transport protocol portion described in the present disclosure. In the example of FIG. 3 the user data from the server application to the client application flows in the server apparatus 101-$k$ via the transport protocol portion and the complementary transport protocol portion to the IP layer for transmission to the client apparatus 102-$k$, where the user data may be passed from the IP layer through the transport protocol portion to the client application, whereas in the opposite direction that user data may flow through the layers shown in the illustration of FIG. 3 in the opposite direction. In both cases the user data may be transferred between the respective transport protocol portions in the server apparatus 101 and the client apparatus 102-*k* in respective sequences of data blocks. Moreover, the complementary transport protocol portion in the server apparatus 101 may serve modify the acknowledgment blocks received via the IP layer according to the approach described in the foregoing before passing them to the transport protocol portion, whereas the complementary transport protocol portion may further serve to selectively transmit the control block (described in the foregoing) via the IP layer to the client apparatus 102-*k* using the approach described in the foregoing. The transport protocol portion and the complementary transport protocol portion of the server apparatus 101 may, at least conceptually, provide the transport layer in the server apparatus 101.

The operation of the complementary transport protocol portion, possibly together with the application level mechanisms for handling loss of data and/or to congestion in the communication network 103 in a manner that makes use of characteristics of the transmitted user data and/or capabilities of the server application and the client application, enable significantly improving user-experienced service quality in comparison to that obtainable via usage of the retransmission and/or congestions avoidance mechanism of the transport protocol portion. The improvement in performance may be especially pronounced when the transport protocol portion is intended for generic use (such as one provided as part of an operating system or a browser application and that is available via an API or a socket interface as) and hence cannot account for any specific requirements of the server application and/or when the server application is one requiring especially low latency, such as a gaming application or an audio/video conferencing application.

The examples described in the foregoing refer to transfer of user data between the server apparatus 101 and the client apparatus 102-*k* in the framework of the communication system 100. In another example in this regard, the user data may be transferred between two client apparatuses via the server apparatus 101. In the following, these two client apparatuses are referred to as a first client apparatus 102-*m* and a second client apparatus 102-*n* in order to enhance clarity of the description. In such a communication arrangement, the server apparatus 101 may operate as an intermediate apparatus that forwards data received from the first client apparatus 102-*m* to the second client apparatus 102-*n* and, vice versa, that forwards the data received from the second client apparatus 102-*n* to the first client apparatus 102-*m*.

Figure 4:
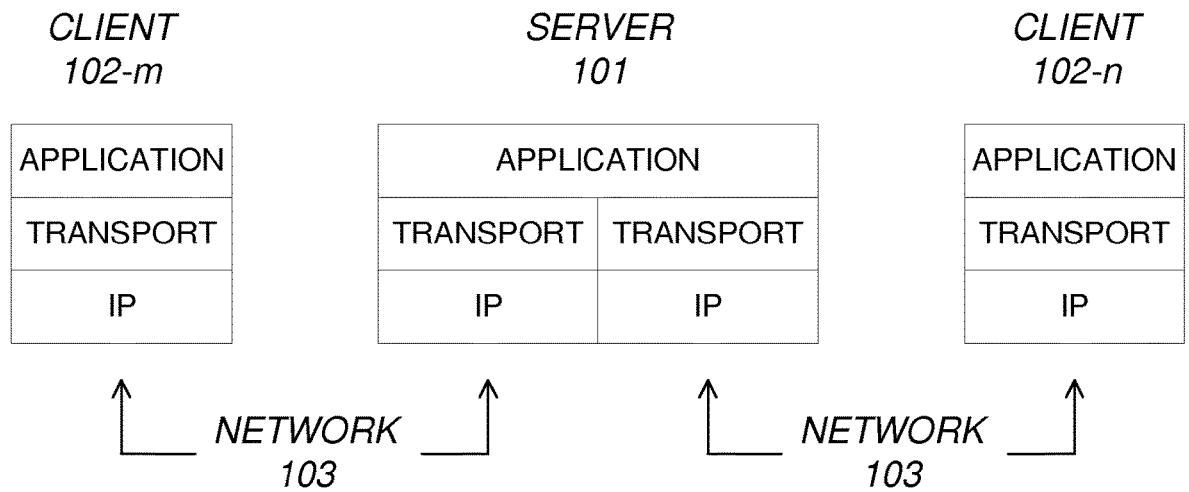
FIG. 4 illustrates a communication model according to an example.

The communication model applied in communication between the first and second client apparatuses 102-*m*, 102-*n* via the server apparatus 101 is illustrated in FIG. 4. In this scenario, each of the first client apparatus 102-*m* and the second client apparatus 102-*n* may execute respective client applications, where the client applications have access to the IP layer that provides the packet-switched communication over the communication network 103 via the transport layer that may be implemented via operation of the transport protocol. The server apparatus 101 may receive transport packets from the first client apparatus 102-*m* in a first transport packet stream, whereas the server application executing in the server apparatus 101 may arrange user data received in the transport packets of the first transport packet stream into transport packets of a second transport packet stream, and transmit the transport packets of the second transport packet stream to the second client apparatus 102-*n*. Along similar lines, the server apparatus 101 may receive transport packets from the second client apparatus 102-*n* in a third transport stream, the server application may arrange user data received in the transport packets of the third transport packet stream into transport packets of a fourth transport packet stream, and transmit the transport packets of the fourth transport packet stream to the first client apparatus 102-*m*. The transport protocol applied in this regard may comprise, for example, the SCTP. In this regard, the remark with respect to the communication model shown in the illustration predominantly serving as one intended for illustrating the relationship between the application and the transport protocol described in the present disclosure provided with reference to FIG. 2 applies to the communication model shown in FIG. 4 as well.

The server apparatus 101 operating as the intermediate apparatus may implement, for example in the transport layer, a first transport protocol portion for communicating with the first client apparatus 102-*m* and a second transport protocol portion for communicating with the second client apparatus 102-*n*, where each of the first transport protocol portion and the second protocol portion may operate in a manner described in the foregoing for the example that involves communication between the server application in the server apparatus 101 and the client application in the client apparatus 102-*k*. Moreover, the transport layer in the server apparatus 101 operating as the intermediate apparatus may comprise a respective complementary transport protocol portion described in the foregoing for each of the first and second transport protocol portions, provided e.g. as a respective sub-layer of the transport layer between the respective one of the first and second transport protocol portions and the IP layer, e.g. according to the example of FIG. 3, mutatis mutandis.

Consequently, the complementary transport protocol portion for the first transport protocol portion may serve to prevent the first transport protocol portion in the server apparatus 101 from retransmitting any of the data blocks to the first client apparatus 102-*m* and to prevent the first transport protocol portion from entering the congestion avoidance state while also setting the transport protocol portion into a state where it does not expect retransmissions of data blocks from the server apparatus 101. Along similar lines, the complementary transport protocol portion for the second transport protocol portion in the server apparatus 101 may serve to prevent the second transport protocol portion from retransmitting any of the data blocks to the second client apparatus 102-*n* and to prevent the second transport protocol portion from entering the congestion avoidance state while also setting the transport protocol portion into a state where it does not expect retransmissions of data blocks from the server apparatus 101.

In the above-described scenario of transmitting the user data between the respective client application in the first client apparatus 102-*m* and the second client apparatus 102-*n* via the server apparatus 101 serving as the intermediate apparatus, the first and second client apparatuses 102-*m*, 102-*n* may not be aware of the server apparatus 101 acting as a 'man in the middle' and from the first and second client apparatuses' 102-*m*, 102-*n* point of view the connection between them may be considered to be a direct one.

Figure 5:
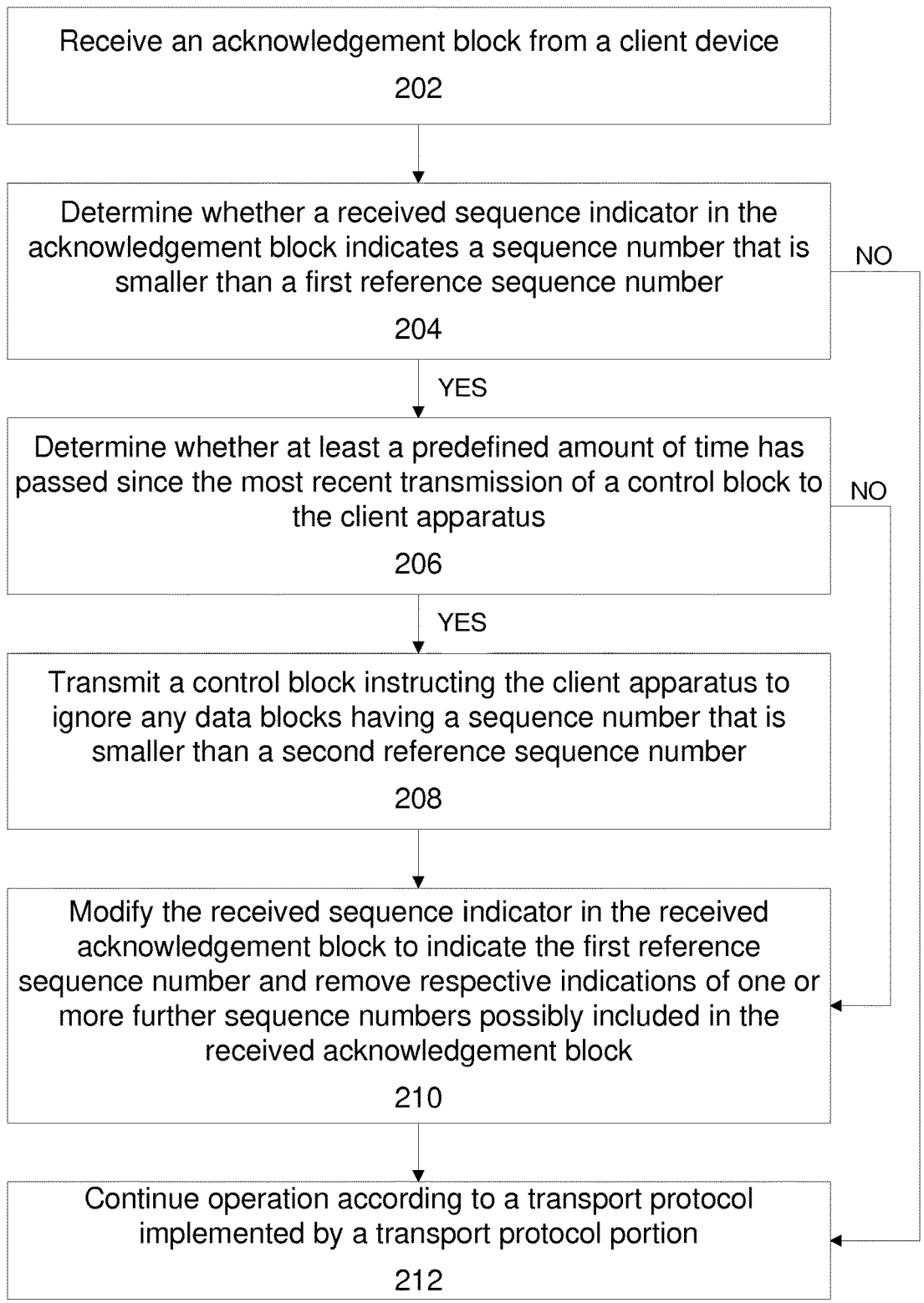
FIG. 5 illustrates a flowchart that represents a method according to an example.

While the description above describes various examples concerning aspects of operation of the transport protocol portion and the complementary transport portion, for example, in the server apparatus 101, FIG. 5 illustrates a flowchart describing a further non-limiting example that pertains to some aspects of joint operation of the transport protocol portion and the complementary transport protocol portion via a method 200. In context of this example, the acknowledgement blocks received from the client apparatus 102-$k$ are assumed to include the received sequence indicator and the indications of the one or more further sequence numbers described in the foregoing. In the method 200, operations described with references to block 204 to 210 represent operations implemented by the complementary transport protocol portion, whereas operations of blocks 202 and 212 pertain to operation according to the transport protocol implemented by the transport protocol portion.

The method 200 proceed from the server apparatus 101 receiving an acknowledgement block from the client apparatus 102-$k$, as indicated in block 202, followed by determining whether the received sequence indicator included in the acknowledgement block indicates a sequence number that is smaller than the first reference sequence number, as indicated in block 204. Along the lines described in the foregoing, the first reference sequence number may comprise the sequence number assigned to the most recently transmitted data block (i.e. the one that is most recently transmitted from the server apparatus 101 to the client apparatus 102-$k$). In case the determination of block 204 is non-affirmative, the method 200 proceeds to block 212 to continue operation according to the transport protocol implemented by the transport protocol portion. In case the determination of block 204 is affirmative, the method 200 proceeds to determine whether at least the predefined amount of time has passed since the most recent transmission of the control block (of the type described in the foregoing) to the client apparatus 102-$k$, as indicated in block 206.

In case the determination of block 206 is non-affirmative, the method 200 proceeds to block 210 to modify the received sequence indicator in the received acknowledgment block to indicate the first reference sequence number and to remove respective indications of the one or more further sequence numbers possibly included in the acknowledgement block. In case the determination of block 206 is affirmative, the method 200 proceeds to transmitting the control block (described in the foregoing) instructing the client apparatus 102-$k$ to ignore any unreceived data blocks having assigned thereto a sequence number that smaller than the second reference sequence number, as indicated in block 208, where the second reference sequence number may comprise the sequence number assigned to the most recently transmitted data block (i.e. the one most recently transmitted from the server apparatus 101 to the client apparatus 102-$k$). Once the operations described with references to block 208 have been carried out, the method 200 may proceed to block 210 to carry out the respective operations described above and further proceed to block 212 to continue operation according to the transport protocol implemented by the transport protocol portion.

The respective operations described with references to blocks 202 to 212 pertaining to the method 200 may be varied or complemented in a number of ways, for example as described in the foregoing and/or in the following with references to the server apparatus 101 and/or to the client apparatus 102-$k$, 102-$m$, 102-$n$.

As briefly described in the foregoing, a non-limiting example of the transport protocol implemented in context of the respective transport protocol portions provided in the server apparatus 101 and in the client apparatuses 102-$k$, 102-$m$, 102-$n$ comprises the SCTP protocol, which is briefly introduced in the following with respect to aspects that are relevant for operation of the transport protocol portions and the complementary transport protocol portions described in the examples provided in the foregoing. In the following, the SCTP is described predominantly with references to communication between the server apparatus 101 and the client apparatus 120-$k$, whereas the description readily generalizes into connection between any two apparatuses, mutatis mutandis.

At a high level, SCTP provides an association between two hosts, e.g. between the server apparatus 101 and the client apparatus 102-$k$, which may be also referred to as SCTP endpoints. The association between server apparatus 101 and the client apparatus 102-$k$ may include respective one or more transport addresses in each of the server apparatus 101 and the client apparatus 102-$k$. In this regard, a single transport address may include a combination of an IP address and an SCTP port number. The latest version of SCTP is specified in full detail in RFC4960, whereas various aspects of SCTP are further defined or elaborated in a number of other RFCs. As an example in this regard, RFC3758 defines support for selectively ignoring portions of transmitted user data. For purposes of the present disclosure, relevant aspects of SCTP operation include transmission of user data from the server apparatus 101 to the client apparatus 102-$k$ together certain aspects related to congestion control and retransmission of packets applied for the user data transmitted from the server apparatus 101 to the client apparatus 102-$k$, which are discussed in further detail in the following.

An SCTP packet includes a packet header together with one or more chunks that may carry user data form the application layer and/or SCTP session control information from one SCTP endpoint to another. User data from the server apparatus 101 to the client apparatus 102-$k$ may be transmitted in DATA chunks. In this regard, each DATA chunk transmitted from an SCTP endpoint includes a Transmission Sequence Number (TSN), which is incremented by a transmitting SCTP endpoint (e.g. the server apparatus 101) for each data chunk transmitted therefrom. The TSNs included in the DATA chunks enable a receiving SCTP endpoint to identify and acknowledge reception of the respective DATA chunk and/or to detect DATA chunks possibly received in duplicate. The receiving SCTP endpoint may use a selective acknowledgement (SACK) chunk to acknowledge DATA chunks received from the transmitting SCTP endpoint and to inform the transmitting SCTP endpoint of possible gaps in a sequence of DATA chunks received at the receiving SCTP endpoint, where the acknowledged DATA chunks reported in the SACK chunk are referred to via their respective TSNs. In this regard, the SACK chunk enables indicating the TSN of the latest DATA chunk of a continuous sequence of DATA chunks (Cumulative TSN Ack) and respective TSNs of any DATA chunks that follow the latest DATA chunk of the continuous sequence with gap(s) in the sequence (Gap Ack Blocks).

Hence, the transmitting SCTP endpoint is kept up to date with respect to the DATA chunks that are successfully delivered to the receiving SCTP endpoint and, conversely, with respect to DATA chunks that may be lost in the network 103 via the SACK chunks received from the receiving SCTP endpoint. With this knowledge, the transmitting SCTP endpoint is able to detect DATA chunks lost in their way to the receiving SCTP endpoint and, consequently, trigger congestion avoidance and/or retransmission mechanisms in the transmitting SCTP endpoint accordingly.

An SCTP endpoint may use a FORWARD TSN chunk (defined in RFC3758) to instruct the receiving SCTP to ignore all (possibly) yet unreceived DATA chunks that have a TSN smaller than that indicated in the FORWARD TSN chunk. Consequently, reception of the FORWARD TSN chunk may result in the receiving SCTP endpoint into a state where it refrains from expecting retransmissions of DATA chunks that have the TSN that is smaller than that indicated in the FORWARD TSN chunk and that may be lost in the transport path between the transmitting and receiving SCTP endpoints.

While the mapping between the elements of the SCTP protocol and corresponding elements processed by the transport protocol portions and the complementary transport protocol portions described in the foregoing is mostly implicit, mapping of some elements is nevertheless explicitly defined herein: the data blocks described in the foregoing may comprise SCTP DATA chunks, the acknowledgement blocks described in the foregoing may comprise SCTP SACK chunks, the control block described in the foregoing may comprise the SCTP FORWARD TSN chunk, the sequence numbers described in the foregoing may comprise SCTP TSNs, the received sequence indicator described in the foregoing may comprise the SCTP Cumulative TSN Ack, and the respective indications of the one or more further sequence numbers may comprise the SCTP Gap Ack blocks.

Figure 6:
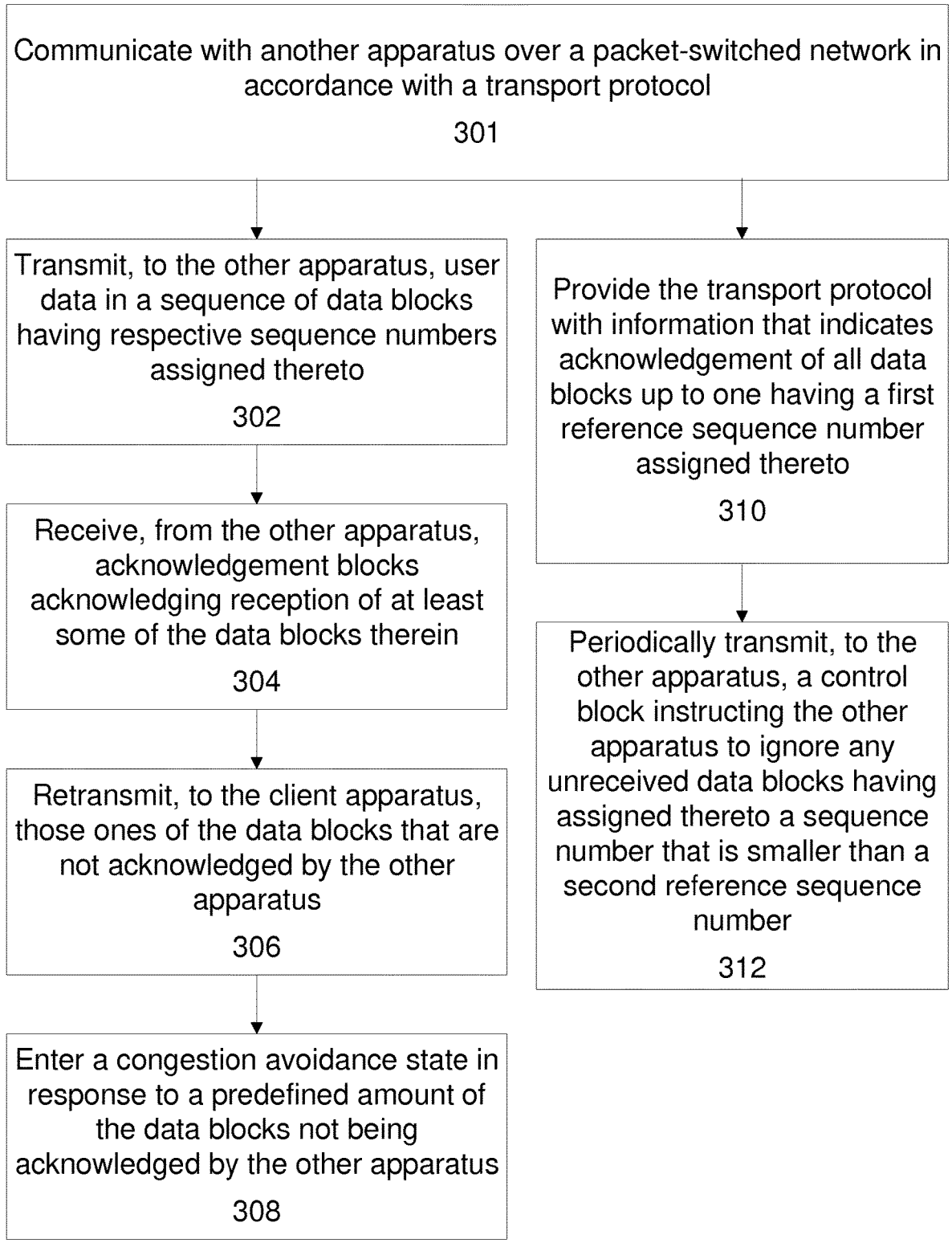
FIG. 6 illustrates a flowchart that represents a method according to an example.

As a further non-limiting example, some aspects pertaining to communication using the transport protocol portion and the complementary transport protocol portion in the server apparatus 101 described in the present disclosure may be operated in accordance with a method 300, which is illustrated in a flowchart-like manner in FIG. 6. The method 300 commences from an apparatus (e.g. the server apparatus 101) communicating with the other apparatus (e.g. the client apparatus 102-k, 102-m, 102-n) over the packet-switched communication network 103 in accordance with the transport protocol implemented in the transport layer in the server apparatus 101, as indicated in block 301.

In this regard, the communication according to the transport protocol may comprise transmitting, to the other apparatus, user data in a sequence of data blocks having respective sequence numbers assigned thereto, as indicted in block 302, receiving, from the other apparatus, acknowledgements blocks acknowledging reception of at least some of said data blocks at the other apparatus, as indicated in block 304, retransmitting, to the other apparatus, those ones of said data blocks that are not acknowledged by the other apparatus, as indicated in block 306, and entering a congestion avoidance state in response to a predefined amount of said data blocks not being acknowledged by the other apparatus, as indicated in block 308. The order of the transport protocol in the apparatus implementing respective operations described herein with references to blocks 302 to 308 may be different from that shown in FIG. 6.

The method 300 further comprises providing the transport protocol with information that indicates acknowledgement of all data blocks up to one having a first reference sequence number assigned thereto, as indicated in block 310, and selectively transmitting 312, to the other apparatus, a control block instructing the other apparatus to ignore any unreceived data blocks having assigned thereto a sequence number that is smaller than a second reference sequence number, as indicated in block 312. The respective operations described with references to blocks 310 and 312 may occur in parallel with those described with references to blocks 302 to 308 and they may occur in an order that is different from the one shown in FIG. 6. Moreover, the respective operations described with references to blocks 302 to 312 pertaining to the method 300 may be varied or complemented in a number of ways, for example as described in the foregoing and/or in the following with references to the server apparatus 101 and/or to the client apparatus 102-k, 102-m, 102-n.

Figure 7:
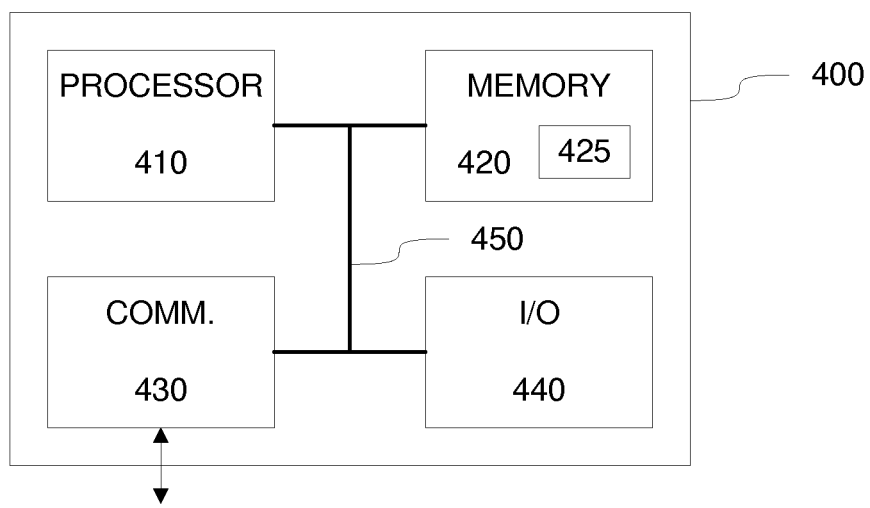
FIG. 7 illustrates a block diagram of some components of an apparatus according to an example.

FIG. 7 illustrates a block diagram of some components of an exemplifying apparatus 400. The apparatus 400 may comprise further components, elements or portions that are not depicted in FIG. 7. The apparatus 400 may be referred to as a computing apparatus and it may be employed e.g. in implementing at least some of the operations, procedures and/or functions described in the foregoing with references to the server apparatus 101 and/or to the client apparatus 102-k, 102-m, 102-n.

The apparatus 400 comprises a processor 410 and a memory 420. The memory 420 may store data and computer program code 425. The apparatus 400 may further comprise communication portion 430 for wired or wireless communication with other apparatuses over a communication network and/or a communication link. The apparatus 400 may further comprise user I/O (input/output) components 440 that may be arranged, together with the processor 410 and a portion of the computer program code 425, to provide a user interface for receiving input from a user and/or providing output to the user. In particular, the user I/O components 440 may include user input portion, such as one or more keys or buttons, a keyboard, a touchscreen or a touchpad, etc. The user I/O components may include output portion, such as a display or a touchscreen. The components of the apparatus 400 are communicatively coupled to each other via a bus 450 that enables transfer of data and control information between the components.

The memory 420 and a portion of the computer program code 425 stored in the memory 420 may be further arranged, with the processor 410, to cause the apparatus 400 to carry out at least some of the operations, procedures and/or functions described in the foregoing with references to the server apparatus 101 and/or to the client apparatus 102-k, 102-m, 102-n. The processor 410 is configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement at least some of the operations, procedures and/or functions described in the foregoing with references to the server apparatus 101 and/or to the client apparatus 102-k, 102-m, 102-n when loaded into the processor 410. As an example, the computer program code 425 may include a computer program consisting of one or more sequences of one or more instructions. The processor 410 is able to load and execute the computer program by reading the one or more sequences of one or more instructions included in the computer program from the memory 420. The one or more sequences of one or more instructions may be configured to, when executed by the processor 410, cause the apparatus 400 to carry out at least some of the operations, procedures and/or functions described in the foregoing with references to the server apparatus 101 and/or to the client apparatus 102-k, 102-m, 102-n. Hence, the apparatus 400 may comprise at least one processor 410 and at least one memory 420 including the computer program code 425 for one or more programs, the at least one memory 420 and the computer program code 425 configured to, with the at least one processor 410, cause the apparatus 400 to carry out at least some of the operations, procedures and/or functions described in the foregoing with references to the server apparatus 101 and/or to the client apparatus 102-k, 102-m, 102-n.

The computer program code 425 may be provided e.g. a computer program product comprising at least one computer-readable non-transitory medium having the computer program code 425 stored thereon, which computer program code 425, when executed by the processor 410 causes the apparatus 400 to carry out at least some of the operations, procedures and/or functions described in the foregoing with references to the server apparatus 101 and/or to the client apparatus 102-k, 102-m, 102-n. The computer-readable non-transitory medium may comprise a memory device or a record medium that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc.

The invention claimed is:

1. An apparatus for communication with another apparatus over a packet-switched network, wherein the apparatus comprises a transport protocol portion arranged to cause the apparatus to carry out at least the following:
    transmit, to the other apparatus, user data in a sequence of data blocks having respective sequence numbers assigned thereto,
    receive, from the other apparatus, acknowledgements blocks acknowledging reception of at least some of said data blocks,
    retransmit, to the other apparatus, those ones of said data blocks that are not acknowledged by the other apparatus,
    enter a congestion avoidance state in response to a predefined amount of said data blocks not being acknowledged by the other apparatus,
wherein the apparatus comprises a complementary transport protocol portion arranged to:
    provide the transport protocol portion with information that indicates acknowledgement of all data blocks up to one having a first reference sequence number assigned thereto via modifying the acknowledgement blocks received from the other apparatus before passing the acknowledgement blocks to the transport protocol portion such that the respective acknowledgement blocks indicate reception of all data blocks up to one having the first reference sequence number assigned thereto, and
    selectively cause the apparatus to transmit, to the other apparatus, a control block instructing the other apparatus to ignore any unreceived data blocks having assigned thereto a sequence number that is smaller than a second reference sequence number.

2. The apparatus according to claim 1,
wherein the acknowledgement block includes respective indications of sequence numbers assigned to one or more data blocks received at the other apparatus.

3. The apparatus according to claim 2, wherein
each acknowledgement block includes a received sequence indicator that indicates a sequence number assigned to the last data block of a continuous sub-sequence of data blocks received at the other apparatus, and
the complementary transport protocol portion is arranged to replace the received sequence indicator in the acknowledgement blocks received from the other apparatus with information that indicates the first reference sequence number before passing the acknowledgement blocks to the transport protocol portion.

4. The apparatus according to claim 3, wherein
each acknowledgement block further includes respective indications of one or more further sequence numbers that are assigned to respective one or more data blocks that follow said continuous sub-sequence with at least one gap between the continuous sub-sequence of data blocks and the one or more data blocks identified by said one or more further sequence numbers, and
wherein the complementary transport protocol portion is arranged to remove said indications of the one or more further sequence numbers from the acknowledgement blocks received from the other apparatus before passing the acknowledgement blocks to the transport protocol portion.

5. The apparatus according to claim 1, wherein the first reference sequence number comprises a sequence number assigned to the most recently transmitted one of said data blocks.

6. The apparatus according to claim 1, wherein the second reference sequence number comprises a sequence number assigned to the most recently transmitted one of said data blocks.

7. The apparatus according to claim 1, wherein the complementary transport protocol portion is arranged to cause the apparatus to transmit said control block in response to the sequence number assigned to the last data block of a continuous sub-sequence of data blocks acknowledged by the other apparatus being smaller than the second reference sequence number.

8. The apparatus according to claim 1, wherein the complementary transport protocol portion is arranged to cause the apparatus to transmit said control block in response to the sequence number assigned to the last data block of a continuous sub-sequence of data blocks acknowledged by the other apparatus being smaller than the second reference sequence number provided that at least a predefined amount of time has passed since the most recent transmission of the control block.

9. The apparatus according to claim 8, wherein said predefined amount of time is within a range from 2 milliseconds to 100 milliseconds.

10. The apparatus according to claim 1, wherein the complementary transport protocol portion is arranged to cause the apparatus to transmit said control block at predefined time intervals.

11. The apparatus according to claim 10, wherein said time interval has a predefined duration within a range from 2 milliseconds to 100 milliseconds.

12. The apparatus according to claim 1, wherein the transport protocol portion is arranged to apply the Stream Control Transmission Protocol, SCTP.

13. The apparatus according to claim 2, wherein the first reference sequence number comprises a sequence number assigned to the most recently transmitted one of said data blocks.

14. The apparatus according to claim 3, wherein the first reference sequence number comprises a sequence number assigned to the most recently transmitted one of said data blocks.

15. The apparatus according to claim 4, wherein the first reference sequence number comprises a sequence number assigned to the most recently transmitted one of said data blocks.

16. The apparatus according to claim 2, wherein the second reference sequence number comprises a sequence number assigned to the most recently transmitted one of said data blocks.

17. The apparatus according to claim 3, wherein the second reference sequence number comprises a sequence number assigned to the most recently transmitted one of said data blocks.

18. The apparatus according to claim 4, wherein the second reference sequence number comprises a sequence number assigned to the most recently transmitted one of said data blocks.

19. A method in an apparatus for communication with another apparatus over a packet-switched network in accordance with a transport protocol, wherein communication according to the transport protocol comprises:

transmitting, to the other apparatus, user data in a sequence of data blocks having respective sequence numbers assigned thereto, receiving, from the other apparatus, acknowledgements blocks acknowledging reception of at least some of said data blocks, retransmitting, to the other apparatus, those ones of said data blocks that are not acknowledged by the other apparatus, entering a congestion avoidance state in response to a predefined amount of said data blocks not being acknowledged by the other apparatus, wherein the method comprises:

providing the transport protocol with information that indicates acknowledgement of all data blocks up to one having a first reference sequence number assigned thereto via modifying the acknowledgement blocks received from the other apparatus before passing the acknowledgement blocks to the transport protocol portion such that the respective acknowledgement blocks indicate reception of all data blocks up to one having the first reference sequence number assigned thereto, and selectively transmitting, to the other apparatus, a control block instructing the other apparatus to ignore any unreceived data blocks having assigned thereto a sequence number that is smaller than a second reference sequence number.

20. A non-transitory computer-readable medium on which is stored a computer program comprising computer readable program code configured to cause performing at least the method according to claim 19 when said program code is executed on a computing apparatus.

* * * * *